(12) United States Patent
Conway et al.

(10) Patent No.: US 7,920,597 B2
(45) Date of Patent: Apr. 5, 2011

(54) METHOD AND SYSTEM FOR LOW POWER IDLE SIGNAL TRANSMISSION IN ETHERNET NETWORKS

(75) Inventors: Bruce Conway, Aliso Viejo, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 591 days.

(21) Appl. No.: 11/859,385

(22) Filed: Sep. 21, 2007

(65) Prior Publication Data

US 2008/0225841 A1    Sep. 18, 2008

Related U.S. Application Data

(60) Provisional application No. 60/894,240, filed on Mar. 12, 2007, provisional application No. 60/917,870, filed on May 14, 2007.

(51) Int. Cl.
*H04J 3/06* (2006.01)

(52) U.S. Cl. ........ 370/503; 370/241; 370/352; 370/389; 370/445; 370/463; 370/522; 375/353; 375/354; 375/356

(58) Field of Classification Search ........ 370/241, 370/352, 389, 445, 463, 503, 522; 375/353, 375/354, 356
See application file for complete search history.

(56) References Cited

U.S. PATENT DOCUMENTS

| | | | | |
|---|---|---|---|---|
| 5,805,597 | A * | 9/1998 | Edem | 370/445 |
| 6,690,650 | B1 * | 2/2004 | Stener | 370/241 |
| 6,724,829 | B1 | 4/2004 | Tzuckerman | |
| 6,795,450 | B1 * | 9/2004 | Mills et al. | 370/463 |
| 6,853,637 | B1 * | 2/2005 | Norrell et al. | 370/352 |
| 6,856,597 | B1 | 2/2005 | Scott | |
| 7,050,517 | B1 | 5/2006 | Sallaway et al. | |
| 7,065,167 | B2 * | 6/2006 | McClellan | 375/353 |
| 7,308,058 | B2 | 12/2007 | Zerbe et al. | |
| 2006/0034295 | A1 | 2/2006 | Cherukuri et al. | |

(Continued)

FOREIGN PATENT DOCUMENTS

EP    1 473 870    11/2004

(Continued)

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

Grow, "802.1 and Energy Efficient Ethernet", [Online] Sep. 11, 2007, pp. 1-6, http://www.ieee802.org/3/eee_study/public/sep07/grow_1_0907.pdf.

(Continued)

*Primary Examiner* — William Trost, IV
*Assistant Examiner* — Toan D Nguyen
(74) *Attorney, Agent, or Firm* — McAndrews, Held & Malloy, Ltd.

(57) ABSTRACT

Aspects of a method and system for low power IDLE signal transmission in Ethernet networks are provided. In this regard, during time periods between transmissions of actual data by a local Ethernet link partner, the local Ethernet Link partner may generate one or more signals, in place of a standard Ethernet IDLE signal, that enable synchronization between Ethernet link partners. In this manner, the generated signals may enable reducing power consumption as compared to standard Ethernet IDLE signals. Accordingly, link activity may be monitored to enable detecting periods when there may be no actual data for transmission and the generated signals may be transmitted. The generated signals may be transmitted at a reduced symbol rate as compared to standard Ethernet IDLE signals. The generated signals may be transmitted via fewer network links as compared to standard Ethernet IDLE signals.

27 Claims, 8 Drawing Sheets

U.S. PATENT DOCUMENTS

| | | |
|---|---|---|
| 2007/0280239 A1 | 12/2007 | Lund |
| 2008/0069014 A1 | 3/2008 | Powell et al. |
| 2008/0181154 A1* | 7/2008 | Sherman ............. 370/311 |
| 2008/0225841 A1 | 9/2008 | Conway et al. |
| 2009/0180529 A1 | 7/2009 | Agazzi et al. |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

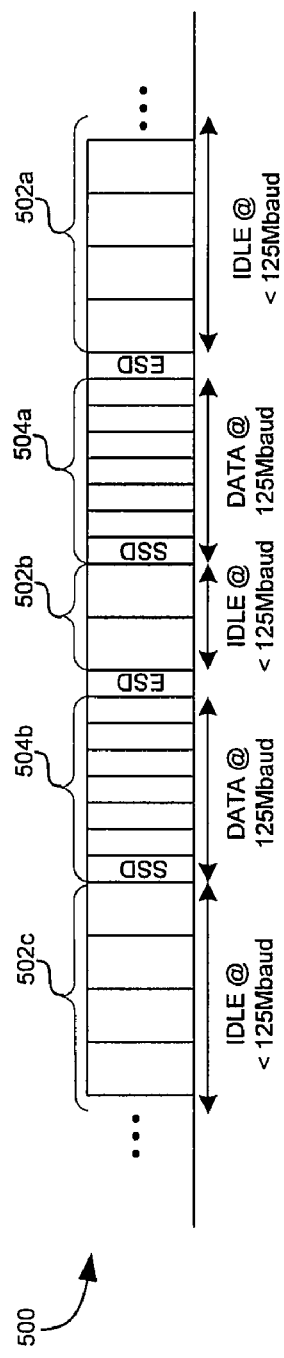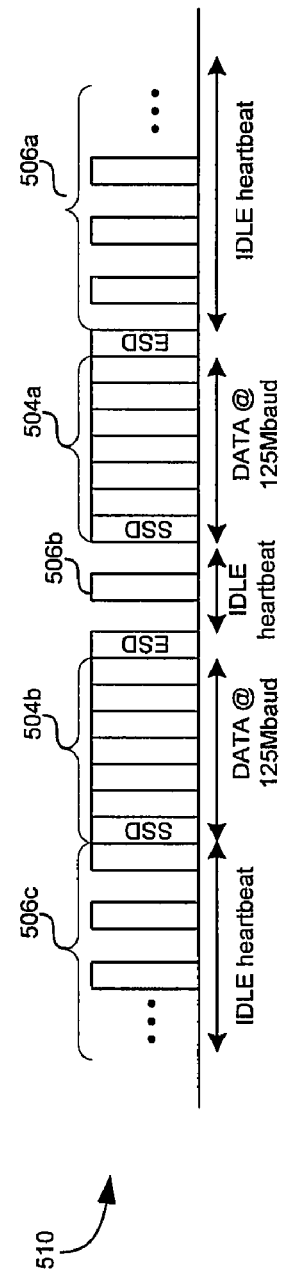

US 7,920,597 B2

METHOD AND SYSTEM FOR LOW POWER IDLE SIGNAL TRANSMISSION IN ETHERNET NETWORKS

CROSS-REFERENCE TO RELATED APPLICATIONS/INCORPORATION BY REFERENCE

This patent application makes reference to, claims priority to and claims benefit from U.S. Provisional Patent Application Ser. No. 60/894,240 filed on Mar. 12, 2007.

This patent application also makes reference to, claims priority to and claims benefit from U.S. Provisional Patent Application Ser. No. 60/917,870 filed on May 14, 2007.

This application also makes reference to:
U.S. patent application Ser. No. 11/859,429 filed on even date herewith;
U.S. patent application Ser. No. 11/859,459 filed on even date herewith; and
U.S. patent application Ser. No. 11/859,482 filed on even date herewith;

Each of the above stated applications is hereby incorporated herein by reference in its entirety.

FIELD OF THE INVENTION

Certain embodiments of the invention relate to networking. More specifically, certain embodiments of the invention relate to a method and system for low power IDLE signal transmission in Ethernet networks.

BACKGROUND OF THE INVENTION

As the number of devices connected to data networks increases and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. However, with the increase in data rates more sophisticated signal processing is required. Additionally, higher data rates and more advanced circuitry may increase power consumption in networks and networking devices. Accordingly, with the increasing shift towards wireless and battery powered devices, ways to reduce power consumption while maintaining high data rates are needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for low power IDLE transmission in Ethernet networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5a is a diagram illustrating low power IDLE signals via a reduced symbol rate, in accordance with an embodiment of the invention.

FIG. 5b is a diagram illustrating transmission of low power sync signals instead of a conventional IDLE signal, in accordance with an embodiment of the invention.

DETAILED DESCRIPTION OF THE INVENTION

Certain embodiments of the invention may be found in a method and system for low power IDLE signal transmission. In this regard, during time periods between transmissions of actual data by a local Ethernet link partner, the local Ethernet Link partner may generate one or more signals, in place of a standard Ethernet IDLE signal, that enable synchronization between Ethernet link partners. In this manner, the generated signals may enable reducing power consumption as compared to standard Ethernet IDLE signals. Accordingly, link activity may be monitored to enable detecting periods when there may be no actual data for transmission and the generated signals may be transmitted. The generated signals may be transmitted at a reduced symbol rate as compared to standard Ethernet IDLE signals. The generated signals may be transmitted via fewer network links as compared to standard Ethernet IDLE signals. In this regard, one or more links may be designated, via logic, circuitry, and/or code, for carrying only the generated signals. Additionally, the link(s) via which the generated signals are transmitted may vary over time. The generated signals may comprise periodic pulses such as a simple "heartbeat" signal. The generated signals may be communicated in bursts. The generated signals may be represented utilizing a reduced signal constellation.

Figure 1:
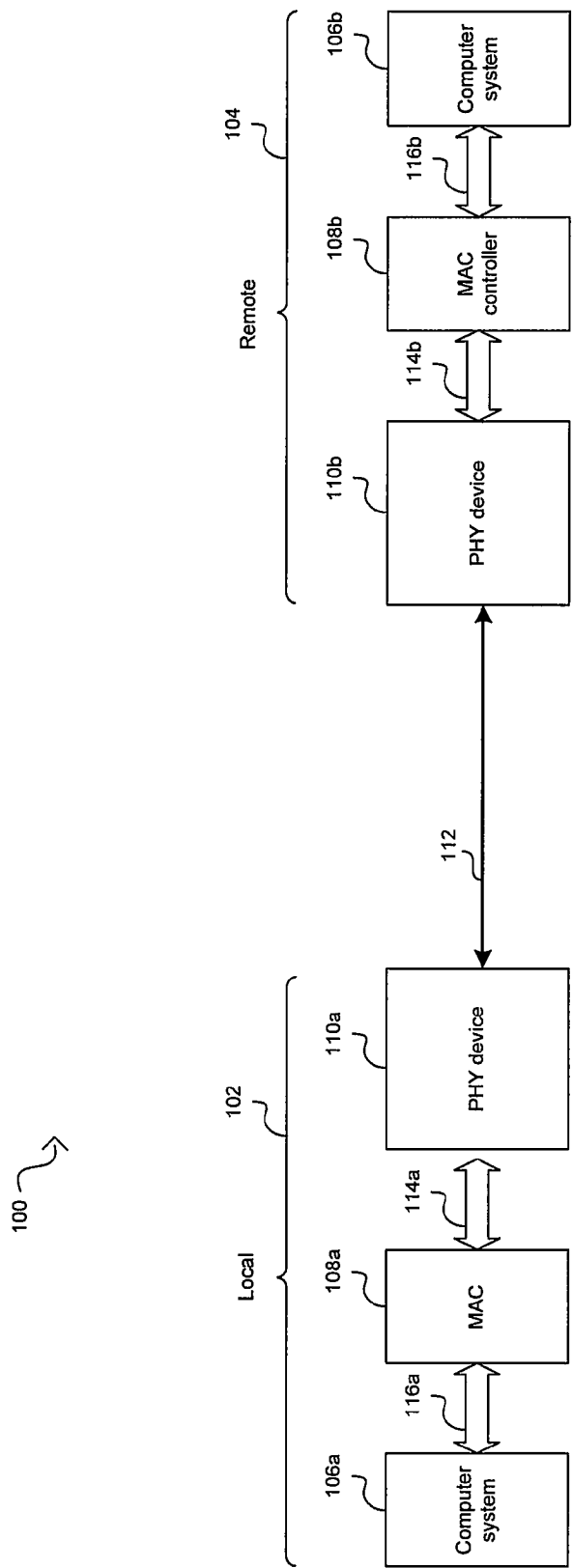
FIG. 1 is a block diagram illustrating an Ethernet over twisted-pair cabling link between a local link partner and a remote link partner, in connection with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four or more links, each of which may, for example, comprise an unshielded twisted pair (UTP). The local link partner 102 and the remote link partner 104 may communicate via two or more links comprising the cable 112. For example, Ethernet over twisted pair standards 10Base-T and 100Base-TX may utilize two pairs of UTP while Ethernet over twisted pair standards 1000Base-T and 10GBase-T may utilize four pairs of UTP.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, hosts or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode. In this regard, the PHY devices 110a and 110b may be enabled to select the fastest configuration supported by both. In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates.

The PHY devices 110a and 110b may utilize multilevel signaling, for example. For example, for 1000 Mbps Ethernet applications, a PAM-5 transmission scheme may be utilized in each twisted-pair wire, where PAM-5 refers to PAM with five levels $\{-2, -1, 0, 1, 2\}$. Similarly, for 100 Mbps Ethernet Application, multilevel threshold-3 (MLT3) encoding may be utilized in each twisted-pair wire, where three levels $\{-1, 0, 1\}$ are utilized.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE signals that may be communicated between frames of data. In this regard, IDLE signals may conventionally be used to keep link partners synchronized between frames of actual data. For example, data transmitted over an Ethernet link may be "scrambled" according to a pseudo-random sequence. Accordingly, a receiver has to decode received data utilizing the same pseudo random sequence as was used to generate the data. In this manner, if the pseudo-random generator of the transmitter and the receiver are not synchronized, the receiver will be unable to decipher received data. However, IEEE standard IDLE signals are formatted in a manner very similar to real data and the transmission of IDLE signals may thus consume a significant amount of power. Accordingly, aspects of the invention may enable reducing power consumption in high speed data networks by altering the coding, formatting, and/or transmission characteristics of IDLE signals.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer adds its own header to the data passed on from the interfacing layer above it. However, during reception, a compatible device having a similar OSI stack strips off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

Figure 2:
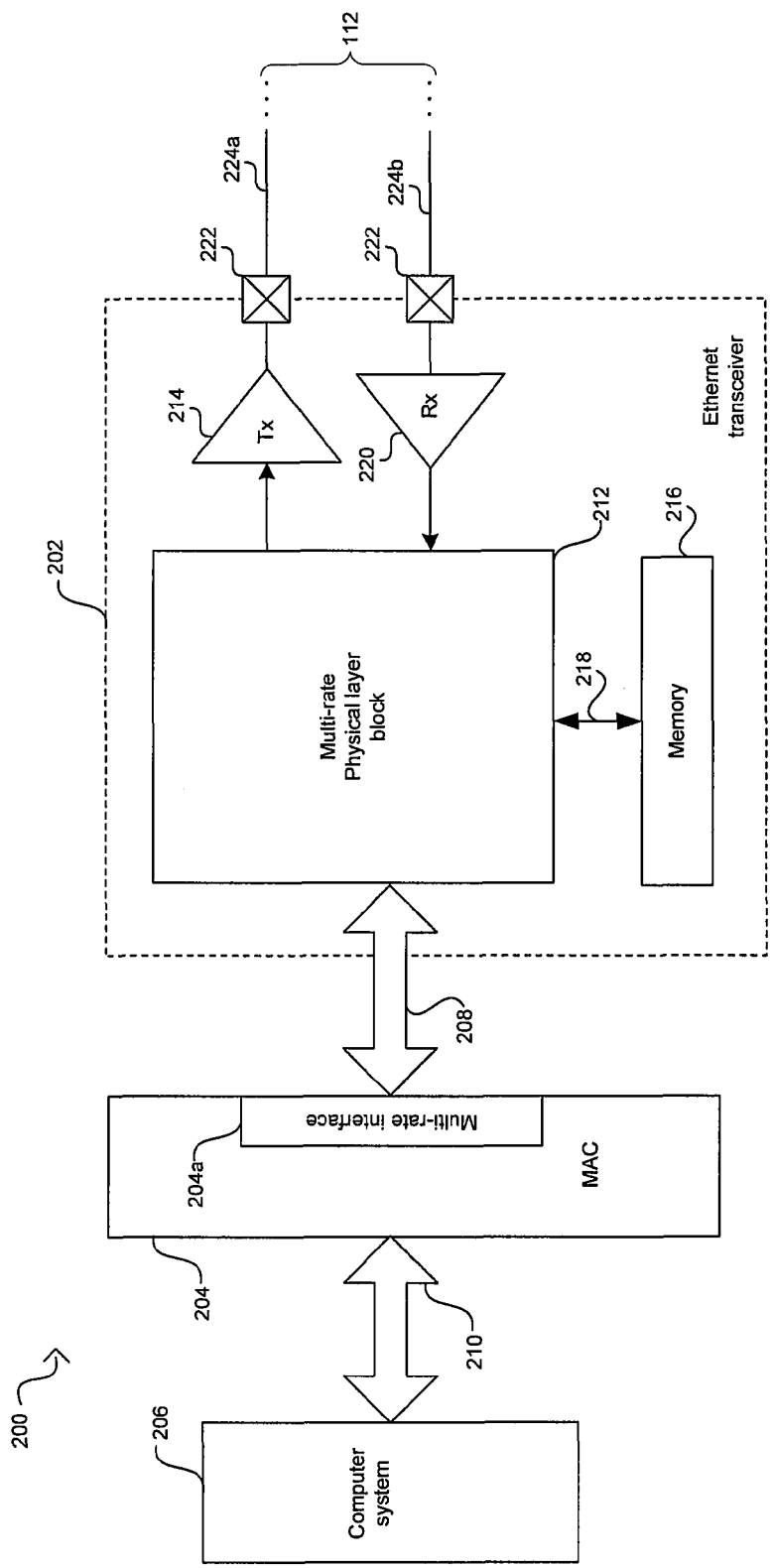
FIG. 2 is a block diagram illustrating an Ethernet system over twisted-pair cabling link between an upstream link partner and a downstream link partner, in connection with an embodiment of the invention.

FIG. 2 is a block diagram illustrating an Ethernet system over twisted-pair cabling link between an upstream link partner and a downstream link partner, in connection with an embodiment of the invention. Referring to FIG. 2, there is shown a link partner 200 that comprises an Ethernet over twisted pair PHY device 202, a MAC controller 204, a host 206, an interface 208, and a bus controller interface 210.

The PHY device 202 may be an integrated device that comprises a multi-rate physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the PHY device 202 at a plurality of data rates via the interface 208.

The multi-rate physical layer block 212 in the PHY device 202 may comprise suitable logic, circuitry, and/or code that may enable operability and/or functionality of physical layer requirements. In this regard, the multi-rate physical layer block 212 may enable generating the appropriate link discovery signaling utilized for establishing communication with a remote PHY device in a remote link partner. In this regard, a 10base-T PHY device may transmit normal link pulses (NLPs) periodically. Similarly, during auto-negotiation, 100Base-TX, 1000Base-T, and 10Gbase-T PHY devices may transmit fast link pulse (FLP) bursts, where each burst comprises a train of NLPs.

The multi-rate physical layer block 212 may communicate with the MAC controller 204 via the interface 208. In one aspect of the invention, the interface 208 may be a media independent interface (MII) and may be configured to utilize a plurality of serial data lanes for receiving data from the multi-rate physical layer block 212 and/or for transmitting data to the multi-rate physical layer block 212, in order to achieve higher operational speeds such as 1 Gbps or 10 Gbps, for example. The multi-rate physical layer block 212 may be configured to operate in one or more of a plurality of communication modes, where each communication mode implements a different communication protocol. These communication modes may include, but are not limited to, Ethernet over twisted pair standards 10Base-T, 100Base-TX, 1000Base-T, 10GBase-T, and other similar protocols that utilize multiple links between link partners. The multi-rate physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate physical layer block 212. The parameters may comprise configuration data and the code may comprise operational code such as software and/or firmware, but the information need not be limited in this regard. Moreover, the parameters may include adaptive filter and/or block coefficients for use by the multi-rate physical layer block 212, for example.

The transmitter 214 may comprise suitable logic, circuitry, and/or code that may enable transmission of data from the link partner 200 to a remote link partner via, for example, the cable 112 in FIG. 1. The receiver 220 may comprise suitable logic, circuitry, and/or code that may enable receiving data from a remote link partner. The transmitter 214 and receiver 220 in the PHY device 202 may correspond to a link that may comprise the cable 112. For example, transmitter 214 and receiver 220 may be utilized to communicate with a remote link partner via two twisted pairs and/or a pair of coaxial cables comprising the cable 112. In this regard, the transmitter/receiver pair may be enabled to provide the appropriate communication rate and mode. Additionally, the transmitter 214 may transmit utilizing single-ended (unbalanced), and/or differential (balanced) signaling methods, and the receiver 220 may receive single-ended (unbalanced), and/or differential (balanced) signals.

The input/output interfaces 222 may comprise suitable logic circuitry, and/or code that may enable the PHY device 202 to impress signal information onto a physical medium comprising a link such as the cable 112 disclosed in FIG. 1. Consequently, the input/output interfaces 222a and 222b may, for example, provide conversion between differential and single-ended, balanced and unbalanced, signaling methods. In this regard, the conversion may depend on the signaling method utilized by the transmitter 214, the receiver 220, and the type of medium comprising the link. Accordingly, the input/output interfaces 222a and 222b may comprise one or more baluns and/or transformers and may, for example, enable transmission over a twisted pair. Additionally, the input/output interfaces 222a and 222b may be internal or external to the PHY device 202. In this regard, if the PHY device 202 comprises an integrated circuit, then "internal" may refer to being "on-chip" and/or sharing the same substrate. Similarly, if the PHY device 202 comprises one or more discrete components, then "internal" may refer to being on the same printed circuit board or being within a common physical package.

In operation, the link partner 200 may communicate with a remote partner via the cable 112. For example, for 100 Mbps Ethernet, the link partner 200 may transmit to a remote partner via the link 224a and may receive data from the remote partner via the link 224b. In this regard, in instances when there may be no data for the link partner 200 to transmit, the link partner 200 may transmit IDLE signals to maintain synchronization with the remote link partner. Accordingly, aspects of the invention may enable reducing the power consumption of the link partner 200 via altering the encoding, frequency, amplitude, number, format, and/or other characteristics of the IDLE signals.

In operation, the link partner 200 may communicate with a remote partner via, for example, the cable 112. For example, the link partner 200 may transmit, for example, multimedia content to a remote partner via the link 224a and may receive control and/or auxiliary data associated with the multimedia content from the remote partner via the link 224b. In this regard, the link partner 200 may be enabled to utilize AVB for the transmission and/or reception of data over the links 224a and/or 224b. Additionally, the link partner may be enabled to transmit at a first data rate and receive at a second, possibly different, data rate. For example, the link partner 200 may transmit multimedia content via the link 224a at a data rate of 1 Gbps and may receive control data via the link 224b at a rate of 500 Mbps.

Figure 3:
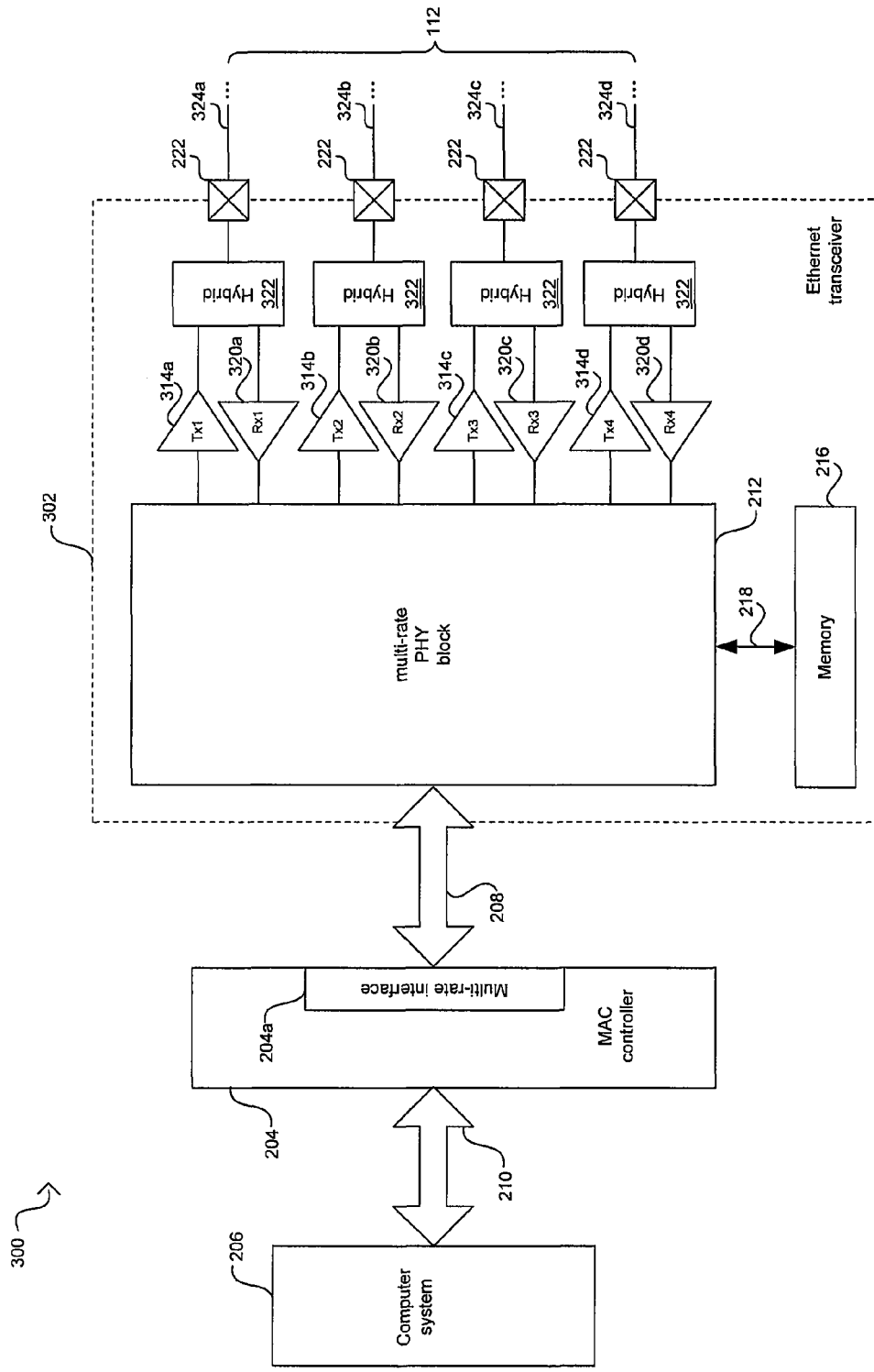
FIG. 3 is a block diagram illustrating an exemplary Ethernet over twisted pair PHY device architecture comprising a multi-rate physical block, in accordance with an embodiment of the invention.

FIG. 3 is a block diagram illustrating an exemplary Ethernet over twisted pair PHY device architecture comprising a multi-rate physical block, in accordance with an embodiment of the invention. Referring to FIG. 3, there is shown a link partner 300 that comprises an Ethernet over twisted pair PHY device 302, a MAC controller 204, a host 206, an interface 208, and a bus controller interface 210. The PHY device 302 may be an integrated device that comprises a multi-rate physical layer block 212, one or more transmitters 314, one or more receivers 320, a memory 216, a memory interface 218, and one or more input/output interfaces 222.

The operation of the MAC controller 204, the host 206, the interface 208, and the bus controller 210 may be as described in FIG. 2. Similarly, the operation of the PHY device 302 may be the same as or substantially similar to that of the PHY device 202 disclosed in FIG. 2. In this regard, the PHY device 302 may provide layer 1 (physical layer) operability and/or functionality that enables communication with a remote PHY device. Notwithstanding, the PHY device 302 may differ from the PHY device 202 of FIG. 2 in that the PHY device 302 may be enabled to transmit and receive simultaneously over up to four physical links. For example, the PHY device 302 may be enabled to transmit and receive data at 1 Gbps, 10 Gbps or higher. In this manner, the PHY device 302 may be 1GBASE-T and/or 10GBASE-T compliant. Accordingly, the link partner 300 may comprise a number of hybrids 322 corresponding to the number of physical links. Each hybrid 322 may comprise suitable logic, circuitry, and/or code that may enable separating transmitted and received signals from a physical link. Each hybrid 322 in the local link partner 300 may be communicatively coupled to an input/output interface 222.

In operation, the link partner 300 may communicate with a remote partner via the cable 112. For example, for 1 Gbps Ethernet, the link partner 300 may transmit data to and receive data from a remote partner via the links 324a, 324b, 324c, and 324d. In this regard, when there is no data for the link partner 200 to transmit, then the link partner 200 may transmit IDLE signals to maintain synchronization with the remote link partner. Accordingly, aspects of the invention may enable reducing the power consumption of the link partner 200 via altering the encoding, frequency, amplitude, number, format, and/or other characteristics of the IDLE signals.

Figure 4:
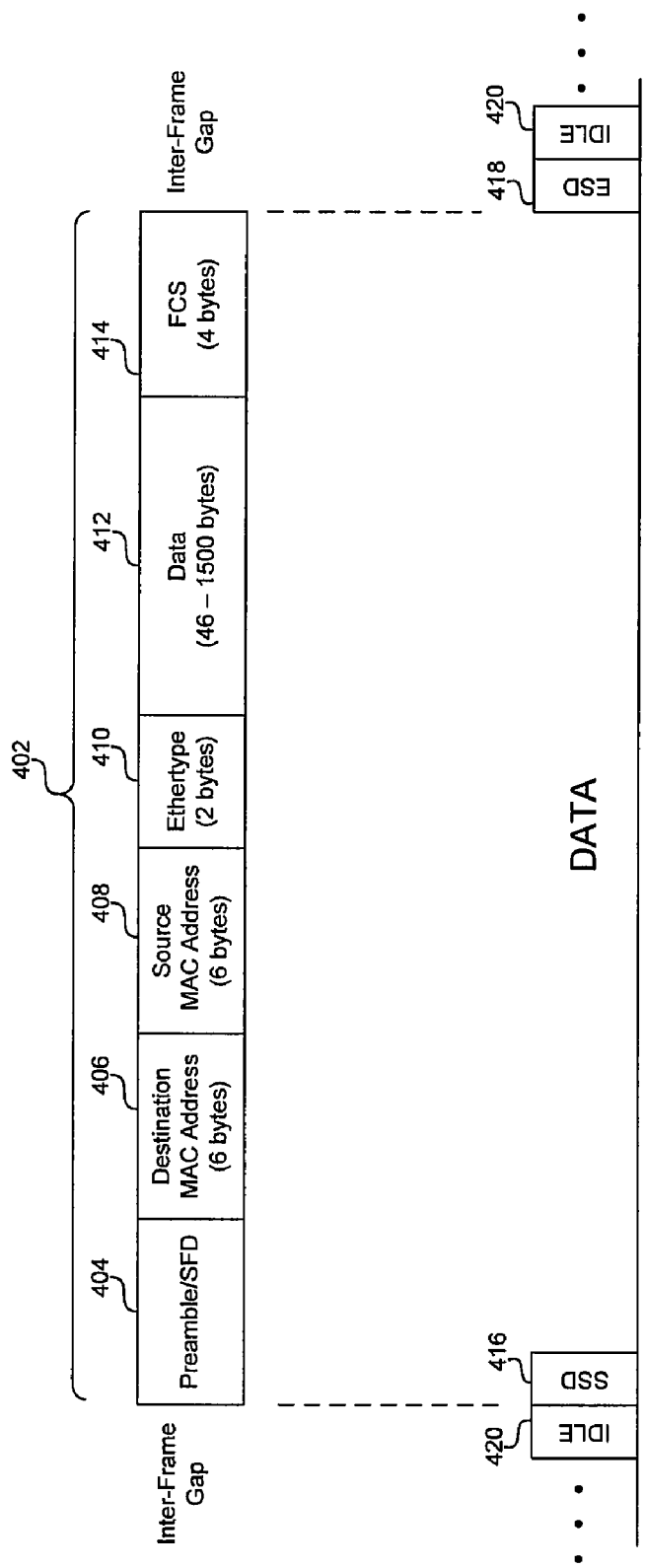
FIG. 4 is a diagram illustrating exemplary activity on an Ethernet link, in accordance with an embodiment of the invention.

FIG. 4 is a diagram illustrating exemplary activity on an Ethernet link, in accordance with an embodiment of the invention. Referring to FIG. 4, there is shown an exemplary Ethernet frame 402, preceded and followed by IDLE signals 420.

The Ethernet frame 402 may comprise a preamble 404, destination MAC address field 406, a source MAC address field 408, an Ethertype field 410, a data field 412, and a frame check sequence (FCS) 414.

The first 62 bits of the preamble may be utilized to phase lock a receiving PHY device to a transmitting PHY device. The last 2 bits of the preamble, '11', may indicate the end of the preamble and that the next bit received will be real data. The final byte of the preamble (the last 8 bits ending in '11') is also known as a start of frame delimiter (SFD) 416. In various embodiments of the invention, the first 8 bits of the preamble may be replaced with a start of stream delimiter (SSD) 416 to indicate the end of an inter-frame gap and the beginning of a frame.

The destination MAC address field 406 may comprise information that may be utilized to identify the node that the packet is to be sent to. The source MAC address 408 field may comprise information that may be utilized to identify the node that originated the packet. The Ethertype field 410 may comprise information that may be utilized to identify the protocol (e.g. IPv4 or IPv6) being transported in the packet. The data field 412 may contain the data being transmitted. The FCS 414 may comprise information that may be utilized to provide error detection for the packet. In various instances of the invention, the frame 402 may be immediately followed by an end of sequence delimiter (ESD) 418 to indicate the end of a frame and the beginning of an inter-frame gap.

The IDLE signals 420 may be utilized to maintain synchronization between link partners. Because a conventional IDLE signal appears very similar to actual data, the IDLE signal may consume a significant amount of power. Accordingly, aspects of the invention may enable, for example, altering the encoding, frequency, duration, amplitude, and/or number of IDLE signals 420.

FIG. 5a is a diagram illustrating low power IDLE signals via a reduced symbol rate, in accordance with an embodiment of the invention. Referring to FIG. 5a there is shown a data stream 500 comprising two periods of real data 504 and three periods of IDLE signal 502. The data stream 500 may be transmitted by a link partner such as the link partners 200 or 300 of FIGS. 2 and 3. In this regard, the blocks of data 504a and 504b may each comprise one or more Ethernet frames and the IDLE signals 502b may be transmitted during an inter-frame gap between the two frames. Additionally, the IDLE signals 502a and 502c may be transmitted during extended periods of link inactivity.

In operation, transmitting the IDLE signals 502a, 502b, 502c at a reduced symbol rate may reduce power consumption required for a link partner to transmit the data stream 500. For example, in 100 Mbps and 1 Gbps Ethernet, the real data 504a and 504b may be transmitted at a standard 125Mbaud (125000000 symbols per second) on each link, while the IDLE signals 502a, 502b, 502c may be transmitted at a lower symbol rate. In one embodiment of the invention, there may be no IDLE signals transmitted during inter-frame gaps. In this regard, the IDLE signals 502b may not be transmitted as the inter-frame gap may be sufficiently short in duration that synchronization between link partners is maintained without IDLE signals.

FIG. 5b is a diagram illustrating transmission of low power sync signals instead of a conventional IDLE signal, in accordance with an embodiment of the invention. Referring to FIG. 5a there is shown a data stream 510 comprising two periods of real data 504 and three periods of IDLE signals 506. The data stream 510 may be transmitted by a link partner such as the link partners 200 or 300 of FIGS. 2 and 3. In this regard, the blocks of data 504a and 504b may each comprise an Ethernet frame and the IDLE signal 506b may be transmitted during an inter-frame gap between the two frames. Additionally, the IDLE signals 506a and 506c may be transmitted during extended periods of link inactivity.

In operation, a periodic signal may be utilized to maintain synchronization between link partners instead of continuous stream IDLE signals as is traditionally used. In one embodiment of the invention, a periodic pulse, or "heartbeat", may be transmitted at regular intervals during link inactive periods. In this regard, the link may be silent for periods of time before and/or after a "heartbeat" pulse. In another embodiment of the invention, a periodic sequence of values may be transmitted to update registers utilized to store synchronization information. For example, a periodic signal containing the current state of a pseudo-random sequence generator may be transmitted such that the pseudo-random sequence generators of two link partners may maintain sync. Similarly, a periodic signal containing a clock or timestamp value may be transmitted such that two link partners may maintain sync during link inactive periods. In one embodiment of the invention, there may be no IDLE signals transmitted during inter-frame gaps. In this regard, the IDLE signals 506b may not be transmitted as the inter-frame gap may be sufficiently short in duration that synchronization between link partners is maintained without IDLE signals.

Figure 5C:
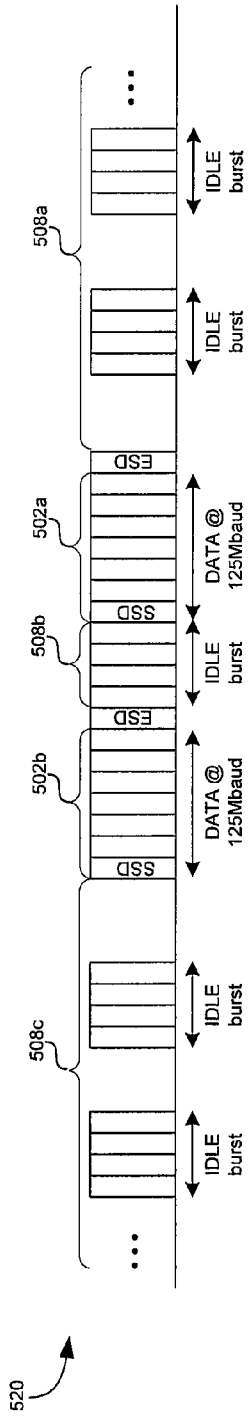
FIG. 5c is a diagram illustrating transmission of low power IDLE signals bursts, in accordance with an embodiment of the invention.

FIG. 5c is a diagram illustrating transmission of low power IDLE signals bursts, in accordance with an embodiment of the invention. Referring to FIG. 5c there is shown a data stream 520 comprising two periods of real data 504 three periods of IDLE signals 508. The data stream 520 may be transmitted by a link partner such as the link partners 200 or 300 of FIGS. 2 and 3. In this regard, the blocks of data 504a and 504b may each comprise an Ethernet frame and the IDLE burst 508b may be transmitted during an inter-frame gap between the two frames. Additionally, the IDLE bursts 508a and 508c may be transmitted during extended periods of link inactivity.

In operation, bursts of IDLE signals may be transmitted at periodic intervals. In an exemplary embodiment of the invention, the length of the bursts 508 may be the inter-frame gap. Accordingly, IDLE signals transmitted between successive frames may be similar to or the same as in conventional systems. However, during extended periods of link activity burst may be periodically transmitted to maintain synchronization between link partners. In other various embodiments of the invention, the bursts may be shorter than the inter-frame gap time.

Figure 5D:
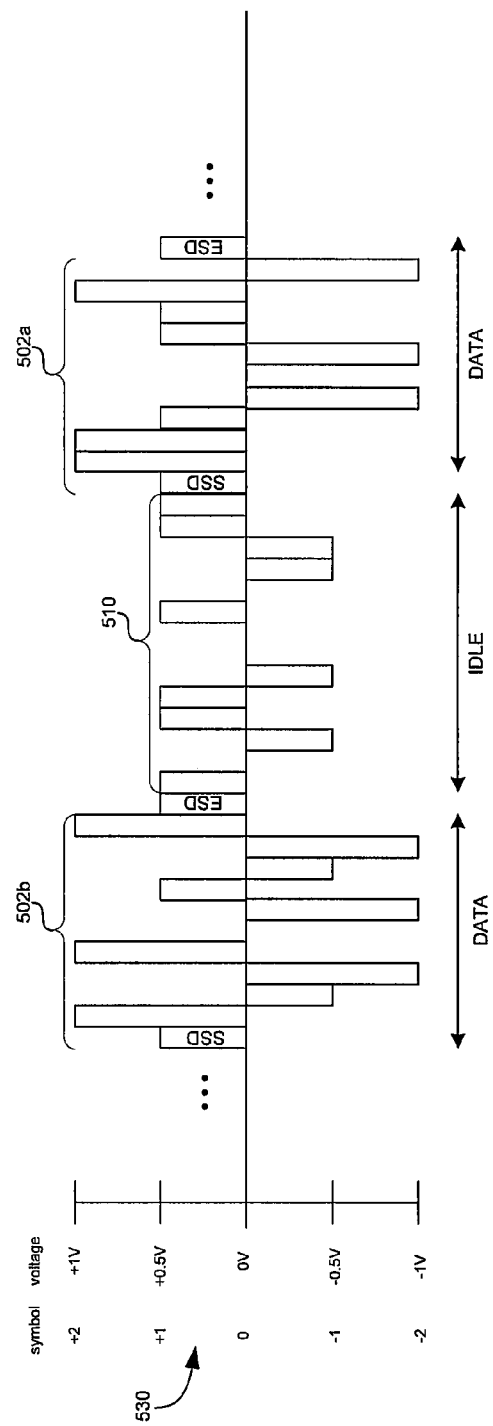
FIG. 5d is a block diagram illustrating transmission of low power IDLE signals via a reduced symbol set, in accordance with an embodiment of the invention.

FIG. 5d is a block diagram illustrating transmission of low power IDLE signals via a reduced symbol set, in accordance with an embodiment of the invention. Referring to FIG. 5d there is shown a data stream 530 comprising two periods of real data 502 separated by a period of IDLE signals 510. The data stream 530 may be transmitted by a link partner such as the link partners 200 or 300 of FIGS. 2 and 3. In this regard, the blocks of data 504a and 504b may each comprise an Ethernet frame and the IDLE burst 510b may be transmitted during an inter-frame gap between the two frames.

In operation, conventional IDLE signals may be generated in a manner similar to real data. In a 1 Gbps Ethernet network for example, PAM-5, with the signal constellation {+2, +1, 0, −1, −2} may be utilized. In this regard, the constellation points +2, +1, 0, −1, −2 may, for example, map to +1V, +0.5V, 0V, −0.5V, and −1V, respectively. Consequently, points +2 and −2 may result in increased power consumption due to the higher voltage utilized to represent them. Accordingly, by representing IDLE signals with only the points {+1, 0, −1}, aspects of the invention may enable reducing power consumption in a network.

In various embodiments of the invention, a reduced set of constellation points may be chosen such that the overall bit error rate (BER) may not be impacted. For example, 1000Base-T may utilize subset partitioning as part of a Trellis Coded Modulation (TCM) scheme. If the 2 constellation points are chosen to be the center point for each subset, the overall BER may not be impacted. This may result in a reduced transmit voltage swing. Transmit power may be directly proportional to transmit voltage swing. Utilizing only 2 of the 5 constellation points may thus require 4 times less power than utilizing 5 constellation points.

Although an example of 1 Gbps Ethernet with a typical 5 point constellation is provided, the original constellation size, the reduced constellation size, the original data rate, the reduced data rate, and/or other characteristics of a network and/or IDLE signal transmission may differ without deviating from the scope of the invention. For example, the MLT-3 scheme utilized for 100 Mbps Ethernet may be utilized for transmitting IDLE signals in a higher rate Ethernet networks such as 1 Gbps and 10 Gbps.

Figure 6:
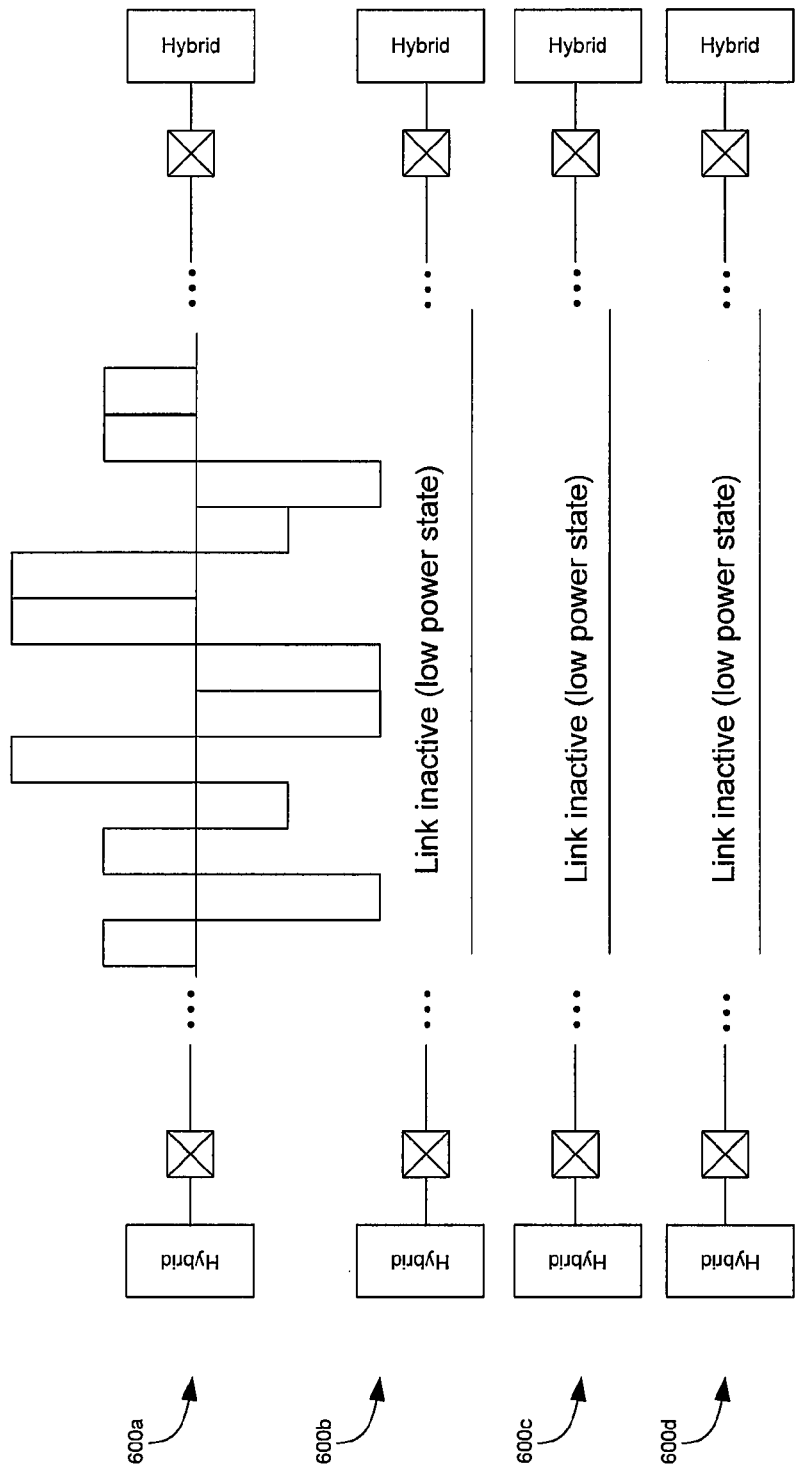
FIG. 6 is a diagram illustrating an exemplary system enabled for reduced power consumption during IDLE periods, in accordance with an embodiment of the invention.

FIG. 6 is a diagram illustrating an exemplary system enabled for reduced power consumption during IDLE periods, in accordance with an embodiment of the invention. Referring to FIG. 6 there is shown four physical links 600a, 600b, 600c, and 600d which may exist, for example, between two link partners such as the link partners 200 and 300. In this regard, power savings may be realized by reducing one or more links to a low(er) power or reduced activity state such that IDLE signals are not transmitted on those links. In various embodiments of the invention, links put into a low(er) power state may continue to transmit signals to maintain link status. In this regard, synchronization functions, equalization, automatic gain control, adaptive echo cancellation, or other signal processing operations may be maintained during low (er) power periods transmission so that a link partner may quickly transition between different data rates. For another example, a 10 Gbps Ethernet network may transmit on only a single link with a data rate approximately 2.5 times slower than the conventional 833 Msps to provide a data rate of 1 Gbps.

Figure 7:
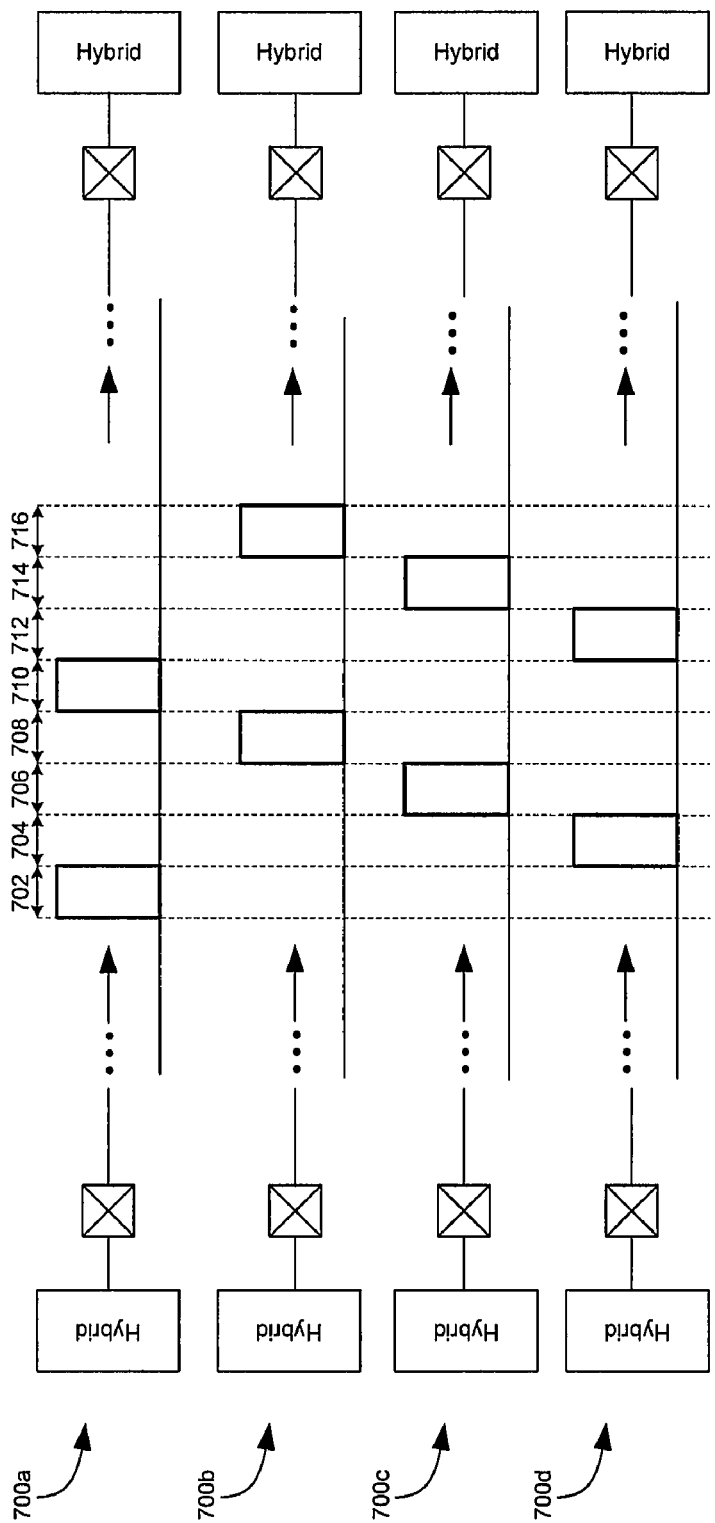
FIG. 7 is a diagram illustrating transmission of low power IDLE signals over four links, in accordance with an embodiment of the invention.

FIG. 7 is a diagram illustrating alternating links placed into a low(er) power state, in accordance with an embodiment of the invention. Referring to FIG. 7 there is activity on four links 700a, 700b, 700c, 7600d during intervals 702 to 716.

In operation, as discussed above, one or more links comprising a cable, such as the cable 112 for example, may be disabled during periods of low(er) activity. In the exemplary embodiment depicted, 3 of the 4 links 700a, 700b, 700c, 700d may be disabled or reduced to a low(er) power state and IDLE signals may be transmitted on a reduced number of links. For example, IDLE signals may be transmitted on the link 700b during the interval 716, the link 700c during the interval 714, the link 600d during the time interval 712, and so forth. In this manner, the length of the intervals 702-716 may be chosen such that a minimum period of inactivity for each of the links 700a, 700b, 700c, and 700d is maintained at less than a determined amount of time. In this manner, the length of the intervals 602 to 616 may be chosen such that each of the links

700$a$, 700$b$, 700$c$, and 700$d$ is able to maintain synchronization and/or other parameters necessary for the rapid transition to a higher data rate.

Aspects of a method and system for low power IDLE signal transmission in Ethernet networks are provided. In this regard, during time periods between transmissions of actual data, such as the interval 510 of FIG. 5$d$, by a local Ethernet link partner, such as the link partners 200 and 300, the local Ethernet Link partner may generate one or more signals, in place of a standard Ethernet IDLE signal, that enable synchronization between Ethernet link partners. In this manner, the generated signals may enable reducing power consumption as compared to standard Ethernet IDLE signals. Accordingly, link activity may be monitored to enable detecting periods when there may be no actual data for transmission and the generated signals may be transmitted. The generated signals may be transmitted at a reduced symbol rate as compared to standard Ethernet IDLE signals, as disclosed in FIG. 5$a$. The generated signals may be transmitted via fewer network links as compared to standard Ethernet IDLE signals, as disclosed in FIGS. 6 and 7. In this regard, one or more links may be designated, via logic, circuitry, and/or code, for carrying only the generated signals. Additionally, the link(s) via which the generated signals are transmitted may vary over time, as disclosed in FIG. 7. The generated signals may comprise periodic pulses such as a simple "heartbeat" signal, as disclosed in FIG. 5$b$. The generated signals may be communicated in bursts, as disclosed in FIG. 5$c$. The generated signals may be represented utilizing a reduced signal constellation, as disclosed in FIG. 5$d$.

Another embodiment of the invention may provide a machine-readable storage, having stored thereon, a computer program having at least one code section executable by a machine, thereby causing the machine to perform the steps as described herein for low power IDLE signal transmission.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing communication in a network, the method comprising:
    during time periods between transmissions of data onto one or more Ethernet links by a local Ethernet link partner, communicating, by said local Ethernet Link partner onto said one or more Ethernet links, one or more signals that enable synchronization of said local Ethernet link partner with one or more remote Ethernet link partners, wherein:
        said one or more signals enable said local Ethernet link partner and/or said remote Ethernet link partner to operate at reduced power when compared to the communication of standard Ethernet IDLE signals between said local Ethernet link partner and said remote link partner; and
        a number of constellation points utilized for said communicating said one or more signals is different from a number of constellation points utilized for communicating said data via said one or more Ethernet links; and said constellation points utilized for said communicating said one or more signals comprise points $\{+1, 0, -1\}$ compatible with the 1GBASE-T standard.

2. The method according to claim 1, comprising detecting said time periods between transmissions of data based on activity on said one or more Ethernet links.

3. The method according to claim 1, comprising communicating said one or more signals over a number of said Ethernet links that is different from a number of said Ethernet links utilized for communicating said data.

4. The method according to claim 1, comprising communicating said one or more signals at a symbol rate that is lower than a symbol rate at which said data is communicated.

5. The method according to claim 1, wherein said one or more signals comprises periodic pulses.

6. The method according to claim 1, comprising communicating said one or more signals between said Ethernet link partners in bursts.

7. The method according to claim 1, comprising, in instances that said one or more Ethernet links comprises a plurality of Ethernet links, alternating which of said Ethernet links is utilized for communication of said one or more signals.

8. The method according to claim 1, comprising, in instances that said one or more Ethernet links comprises a plurality of Ethernet links, communicating said one or more signals over a designated one of said one or more Ethernet links, when each of said Ethernet link partners is operating in an idle mode.

9. The method according to claim 1, comprising, in instances that said one or more Ethernet links comprises a plurality of Ethernet links, maintaining synchronization of said plurality of Ethernet links by communicating said one or more signals on a single one of said plurality of Ethernet links.

10. A machine-readable storage having stored thereon, a computer program having at least one code section for providing communication in a network, the at least one code section being executable by a machine for causing the machine to perform steps comprising:
    during time periods between transmissions of data on one or more Ethernet links, communicating, via said one or more Ethernet links, one or more signals that enable synchronization between Ethernet link partners, wherein:

said one or more signals enable each of said Ethernet link partners to operate at reduced power when compared to the communication of standard Ethernet IDLE signals between said Ethernet link partners; and a number of constellation points utilized for said communicating said one or more signals is different from a number of constellation points utilized for communicating said data via said one or more Ethernet links; and said constellation points utilized for said communicating said one or more signals comprise points {+1, 0, −1} compatible with the 1GBASE-T standard.

11. The machine-readable storage according to claim 10, wherein said at least one code section comprises code for detecting said time periods between transmissions of data based on activity on said one or more Ethernet links.

12. The machine-readable storage according to claim 10, wherein said at least one code section comprises code for communicating said one or more signals over a number of said Ethernet links that is different from a number of said Ethernet links utilized for communicating said data.

13. The machine-readable storage according to claim 10, wherein said at least one code section comprises code for communicating said one or more signals at a symbol rate that is lower than a symbol rate at which said data is communicated.

14. The machine-readable storage according to claim 10, wherein said one or more signals comprises periodic pulses.

15. The machine-readable storage according to claim 10, wherein said at least one code section comprises code for communicating said one or more signals between said Ethernet link partners in bursts.

16. The machine-readable storage according to claim 10, wherein said at least one code section comprises code for, in instances that said one or more Ethernet links comprises a plurality of Ethernet links, alternating which of said Ethernet links is utilized for communication of said one or more signals.

17. The machine-readable storage according to claim 10, wherein said at least one code section comprises code for, in instances that said one or more Ethernet links comprises a plurality of Ethernet links, communicating said one or more signals over a designated one of said one or more Ethernet links, when each of said Ethernet link partners is operating in an idle mode.

18. The machine-readable storage according to claim 10, wherein said at least one code section comprises code for, in instances that said one or more Ethernet links comprises a plurality of Ethernet links, maintaining synchronization of said plurality of Ethernet links by communicating said one or more signals on a single one of said Ethernet links.

19. A system for providing communication in a network, the system comprising:
one or more circuits in a local Ethernet link partner, said one or more circuits being operable to:
during time periods between transmissions of data on one or more Ethernet links, communicate, via said one or more Ethernet links, one or more signals that enable synchronization of said local Ethernet link partner with one or more remote Ethernet link partners, wherein:
said one or more signals enable each of said Ethernet link partners to operate at reduced power when compared to the communication of standard Ethernet IDLE signals between said Ethernet link partners; and a number of constellation points utilized for said communicating said one or more signals is different from a number of constellation points utilized for communicating data via said one or more Ethernet links; and said constellation points utilized for said communicating said one or more signals comprise points {+1, 0, −1} compatible with the 1GBASE-T standard.

20. The system according to claim 19, wherein said one or more circuits in each of said Ethernet link partners enables detecting said time periods between transmissions of data based on activity on said one or more Ethernet links.

21. The system according to claim 19, wherein said one or more circuits in each of said Ethernet link partners enables communication of said one or more signals over a number of said Ethernet links that is different from a number of said Ethernet links utilized for communicating said data.

22. The system according to claim 19, wherein said one or more circuits in each of said Ethernet link partners communicates said one or more signals at a symbol rate that is lower than a symbol rate at which said data is communicated.

23. The system according to claim 19, wherein said one or more signals comprises periodic pulses.

24. The system according to claim 19, wherein said one or more circuits in each of said Ethernet link partners enables communication of said one or more signals between said Ethernet link partners in bursts.

25. The system according to claim 19, wherein said one or more circuits in each of said Ethernet link partners enable, in instances that said one or more Ethernet links comprises a plurality of Ethernet links, alternating which of said Ethernet links is utilized for communication of said one or more signals.

26. The system according to claim 19, wherein said one or more circuits in each of said Ethernet link partners enables communication of said one or more signals over a designated one of said one or more Ethernet, when each of said Ethernet link partners is operating in an idle mode.

27. The system according to claim 19, wherein said one or more circuits in each of said Ethernet link partners enable, in instances that said one or more Ethernet links comprises a plurality of Ethernet links, maintaining synchronization of said plurality of links by communicating said one or more signals on a single one of said Ethernet links.

* * * * *